INVENTOR
FRANK C. WALLACE
BY
ATTYS.

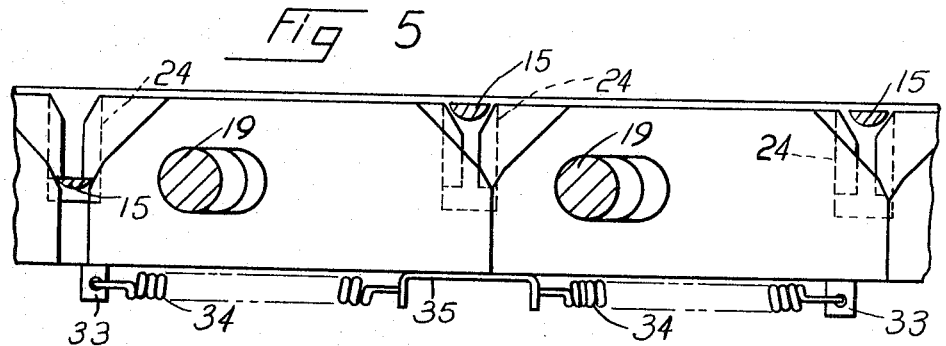
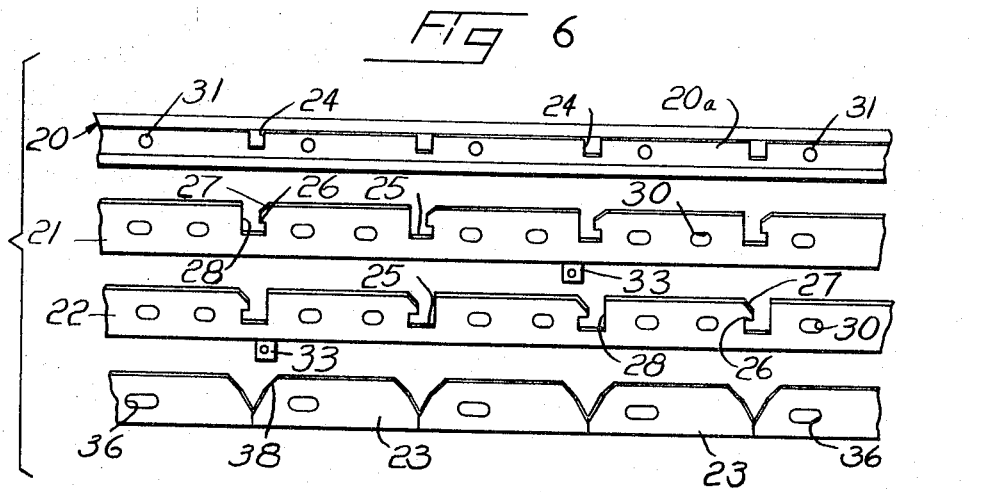
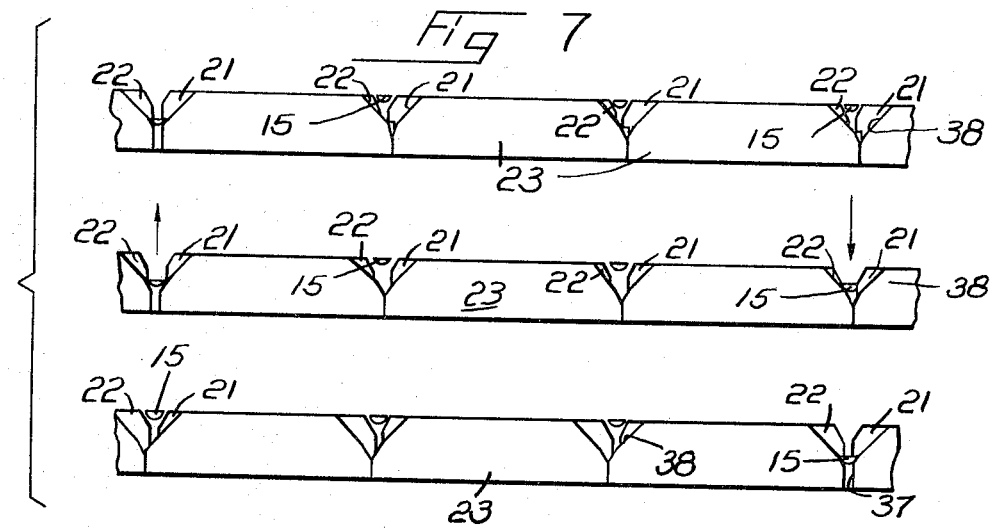

United States Patent Office 3,297,834
Patented Jan. 10, 1967

3,297,834
MULTIPLE SWITCH ASSEMBLY WITH IMPROVED
INTERLOCK TRACK MECHANISM
Frank C. Wallace, Coeur d'Alene, Idaho, assignor to
Pendar, Inc., Coeur d'Alene, Idaho, a corporation of
Idaho
Filed Feb. 28, 1966, Ser. No. 530,692
6 Claims. (Cl. 200—5)

This invention relates to a novel track mechanism for an electric switch assembly.

The present disclosure constitutes an improvement over that shown in U.S. Patent 3,126,457 granted to Edward A. Jones on March 24, 1964. The general application of the apparatus described herein is analogous to that of the patented device. It may be utilized in situations where a plurality of electrical switches are physically positioned and electrically connected in such a manner that it is necessary to insure that only one switch is operated at any given time. The primary feature of the track mechanism described herein is the provision of locking slides to prevent accidental release of a depressed switch due to environmental shock or vibration.

In the previously patented switch mechanism, a sliding track is utilized to hold a reciprocating plunger on the switch unit. The single track is biased in only one direction and is capable of being dislodged by a shock acting against the biasing force. The present invention uses two opposed tracks biased in opposite directions so that shock forces or vibration cannot accidentally release the switch plunger from a locked depressed condition, since one track will always be maintained in place by the same force that might instantaneously displace the remaining track.

It is the first object of the present invention to provide a track mechanism for a plurality of electrical switches wherein the track mechanism is capable of resisting accidental displacement of the switches due to the shock or vibrational forces.

Another object of this invention is to provide such a track mechanism within a relatively small unit that can be incorporated in conventional switch housing assemblies without undue difficulty and without increasing the bulk thereof.

Another object of this invention is to provide positive assurance against accidental displacement of switch plungers by a track mechanism which is also capable of preventing more than one switch from being actuated simultaneously.

A typical switch assembly and track mechanism embodying the instant invention is illustrated in the accompanying drawings. It is to be understood that this illustrative material is only presented by way of example and is not intended as a definition of the extent of the invention.

In the drawings:

FIGURE 5 is an enlarged fragmentary sectional view taken substantially along line 5—5 in FIGURE 2, illustrating the relationship of the track mechanism and switch arms with one switch depressed;

FIGURE 6 is an exploded view showing the basic components of the track mechanism; and FIGURE 7 is a series of schematic views proceeding from top to bottom showing the track mechanism components and illustrating the progressive release of one switch and locking of a second.

The drawings show a series of three switches in FIGURES 1 through 5, it being understood that any number of longitudinally aligned switches can be mounted in combination with the instant track mechanism. In FIGURE 7 there is schematically shown the operation of a group of four switches. The switches illustrated are only shown by way of example. The instant invention is applicable to any conventional type of push button switch. Other switches can be substituted to carry out the required functions so long as the switch has an element that is depressed or released during its operation.

Figure 1:
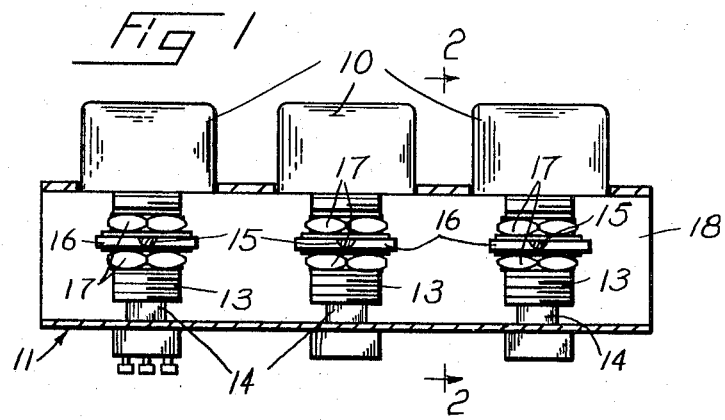
FIGURE 1 is a sectional elevation view taken alongside three switch units cut through the plungers which activate the track mechanism described herein.
Figure 3:
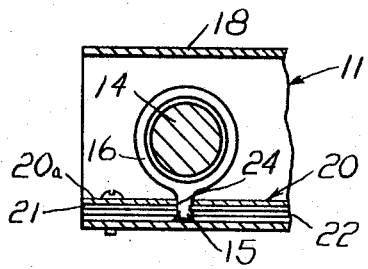
FIGURE 3 is a fragmentary sectional view taken along line 3—3 in FIGURE 2, showing a single switch assembly.
Figure 2:
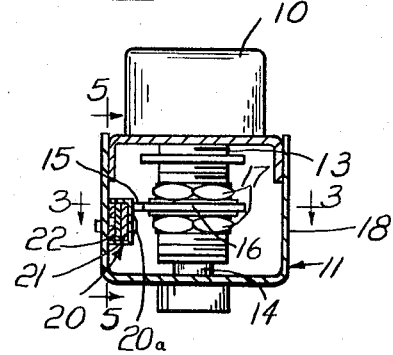
FIGURE 2 is a sectional view through the switch and mounting apparatus as seen along line 2—2 in FIGURE 1.
Figure 4:
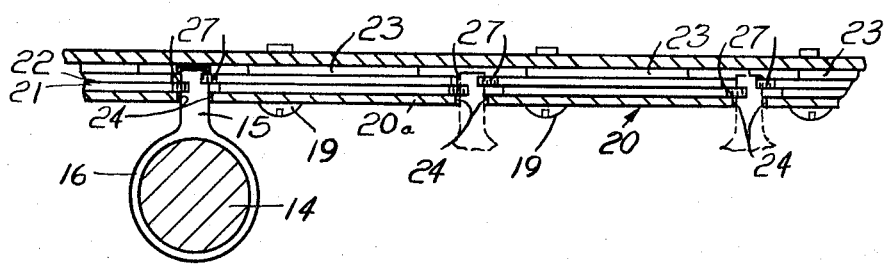
FIGURE 4 is an enlarged view taken along the same plane as shown by line 3—3 in FIGURE 2, showing the details of the track and switch operating components, the relative locations of second and third plungers being shown in dashed lines.

Referring first to FIGURES 1 through 3, there is shown a group of switches having push buttons 10 mounted on a movable plunger 13. Plunger 13 is capable of being reciprocated axially relative to a stationary stem 14 of the switch. The stem 14 is fixed to a supporting housing 11. Stem 14 is provided with electrical contacts through which the switching circuits are completed. Without going into the details of the switch mechanism, it is to be generally understood that the switch contains devices to complete or break electrical circuits upon reciprocation of plunger 13 relative to stem 14, such reciprocation being initiated by depression or release of the push button 10.

Fixed to each plunger 13 is a radially extending arm 15. Each arm 15 is formed integrally with a supporting collar 16 positioned relative to the threaded exterior of plunger 13 by two lock nuts 17. Arm 15 will therefore reciprocate axially in unison with plunger 13. The push buttons 10 are shown in FIGURES 1 through 3 in their released positions, and it is to be understood that the switches need not be mounted in a vertical position and that the orientation of the switches in actual use and the matter of direction of movement is relative to the actual switch position.

The housing 11 is provided with a side wall 18 spaced from the plungers 13. In assembly, each arm 15 extends radially to a position adjacent to the side wall 18. The distance between the plunger 13 and the side wall 18 must be sufficient to accommodate the track mechanism intersected by arms 15 as described below.

Referring specifically to FIGURES 3 through 6, the track assembly includes a channelled guide 20 that, in cooperation with side wall 18, encloses the movable elements of the track mechanism and axially guide the arms 15. The movable track elements include two locking slides 21, 22 and a plurality of interlocking slides 23.

The channelled guide 20 is fixed relative to the side wall 18 of housing 11. It encloses and slidably supports the locking slides 21, 22 and the smaller interlocking slides 23. The elongated guide 20 is provided with an upstanding wall 20a parallel to slides 21, 22 and interlocking slides 23. The slides 21, 22 and the interlocking slides 23 are movably supported by the channelled arm guide 20 for motion in parallel directions longitudinally along the length of guide 20. They are maintained in this longitudinally parallel relationship by sliding contact with flanges protruding toward side wall 18 from the upright wall 20a at the top and bottom longitudinal edges thereof.

The channelled guide 20 is fixed to the side wall 18 of housing 11 by a series of longitudinally spaced bolts 19 or other suitable fastening elements. The bolts 19 are shown mounted from the interior of housing 11, but could obviously be mounted at the exterior thereof. Rivets or other suitable fastening devices can be substituted. The guide 20 (FIGURE 6) is further provided with slots formed through wall 20a that extend perpendicular to its length and which extend toward one longitudinal edge thereof, terminating at the flange adjacent that edge. As can be seen in FIGURE 5, the slots, designated by the numeral 24, permit free movement of the switch arm 15 between its released and depressed positions relative to housing 11. Slots 24 guide the arms 15 and prevent them from moving about the central axes of plungers 13.

The locking slides 21, 22 are identical, the two slides being mounted in the assembly in reverse positions. Each is provided with longitudinally spaced slots 25 open along one longitudinal edge thereof and spaced so as to be aligned with the previously described slots 24 in the guide 20. Slots 25 have one side thereof formed with an inwardly directed shoulder 26 and an inclined outwardly facing edge 27. The opposite side 28 of the each slot 25 is in the form of a straight edge spaced from shoulder 26, being formed in a direction perpendicular to the length of the respective slides 21, 22.

Slides 21, 22 are provided with paired sets of longitudinal slots 30 which permit movement of the slides 21, 22 so as to allow passage of the arms 15 within the respective slots 24 so as to be recieved within the area beneath shoulders 26. Each slot 30 extends toward one end of the slide 21 or 22 from a center line in alignment with the apertures 31 in the channelled arm guide 20 so as to permit limited longitudinal movement of the shoulders 26 to permit passage of arms 15. The relative relationship of the slots is best seen by reference to the center lines illustrated in FIGURE 6.

The longitudinal length of each slot 30 is formed in the locking slide 21, 22 is greater than the diameter of the bolts 19 by an amount substantially equal to the desired longitudinal movement of the locking slide in order to permit clearance of shoulder 26 by a moving arm 15. Each slide 21, 22 is provided with a depending tab 33 that extends through a longitudinal slot cut through one flange of the channelled guide 20. Springs 34, connected between a bracket 35 on guide 20 and the respective tabs 33, bias the respective slides 21, 22 to a position wherein the slides are aligned with guide 20 with shoulders 26 intersecting the area bounded by the slots 24 in guide 20.

The interlocking slides 23 are elongated plate members mounted adjacent to the inner locking slide and adjacent to side wall 18 of housing 11. The interlocking slides 23 are longitudinally movable about one of the fastening bolts 19, being provided with elongated slots 36. Each slot 36 is at least one and a half times as long as the previously described slots 30. The longitudinal end of each slot 36 closest to the end at which it is formed is aligned with the end of the aligned slot 30 adjacent to it (FIGURE 6). The individual slides 23 have a vertically depending end surface 37 and inclined upper edges 38. Each slide 23 is equal in length to the distance between the centers of the slots 25 previously described. The maximum longitudinal movement of the slides 23 relative to the bolts 32 is illustrated in FIGURE 5.

The operation of the track mechanism is best understood from a study of FIGURE 7. As seen at the left end of the top illustration in FIGURE 7, a depressed switch will be locked in its depressed position due to engagement of its radial arm 15 beneath the opposed shoulders 26 formed in slots 25 of the respective locking slides 21, 22. In addition, the depression of arm 15 will spread the adjacent interlocking slides 23 to each side thereof the maximum amount of movement permitted by the slots 36. Since the interlocking slides 23 cannot move beyond this position, it is impossible for more than one arm 15 to be engaged beneath the shoulders 26 of the slides 21, 22. When fully depressed and located under shoulders 26, an arm 15 is prevented from moving outwardly until a second button 10 is depressed to shift the slides 21, 22 by longitudinally by engagement with the inclined edges 27 aligned therewith. Also, accidental jarring of slides 21, 22 cannot dislodge the arm 15 and permit it to pass upwardly beyond the two shoulders 26. Although a shock force in one longitudinal direction relative to the track mechanism might momentarily displace one slide 21 or 22, the remaining slide 21 or 22 will not be affected and its shoulder 26 will maintain arm 15 in its depressed position.

When a second button is depressed, as shown at the right end of the illustrations in FIGURE 7, the spreading action due to engagement of its arm 15 with edges 27 on the aligned slots 25 will first release the arm 15 previously engaged. As the arm 15 is further depressed, it will spread the interlocking slides 23 to each side thereof, this movement being now permitted due to the upward movement of the previously depressed arm 15. The final locked position of the depressed button is as shown at the bottom right hand corner of FIGURE 7. Again, no other button 10 can be depressed without releasing the previously locked switch and it is impossible to lock two switches in a depressed position simultaneously.

The principal feature of this disclosure is the use of two opposed locking slides in combination to permit accidental release of depressed switches. This feature can be utilized in combination with an interlock as shown, with other interlocking mechanisms or without any interlock.

By use of the mechanism described herein, the interlocking relationship that prevents two buttons from being depressed simultaneously is maintained at all times and accidental release of a depressed switch due to vibration or external forces longitudinal to the track mechanism is prevented. The track mechanism described provides a more positive locking arrangement than previously available and enlarges the application of the switch to uses where vibration or external forces are encountered.

Having thus described my invention, I claim:

1. A track mechanism for a plurality of switches located in a longitudinal row on a supporting housing, each switch including a reciprocable plunger movable relative to the housing along axes parallel to one another between an outer released position and an inner depressed position, each switch being further provided with a radially extending arm mounted thereon for conjoint movement with the plunger thereof, comprising:
    guide means on said housing individually engageable with said arms to prevent rotational movement of said arms about the respective axes of the switch plungers;
    first locking means mounted on said housing for longitudinal motion relative thereto in a direction transverse to the direction of movement of said arms, said first locking means being provided with a plurality of slots formed therein respectively receiving the arms of said switches, one side edge of each slot having formed therein an inwardly facing shoulder;
    second locking means mounted on said housing for motion relative thereto transversely to the direction of movement of said arms, said second locking means having formed therein a plurality of slots respectively receiving said arms of said switches, each slot having one side thereof formed with an inwardly facing shoulder directed longitudinally opposite to the shoulders of said first locking means;
    and biasing means operatively connected to said first and second locking means to urge said locking means to positions wherein the shoulders formed on the slots thereof intersect the reciprocable path of said arms as defined by said guide means.

2. An apparatus as defined in claim 1 wherein said guide means comprises a channel member having a first wall mounted parallel to and spaced from a wall of said housing parallel to the reciprocable axes of said switches: said first and second locking means being movably mounted within said guide means.

3. A track mechanism as defined in claim 1 wherein said first and second locking means each comprise identical elongated slides movably carried by said guide means for limited longitudinal motion relative to said guide means, one of said slides being mounted opposite in orientation to the other.

4. A track mechanism as defined in claim 1 wherein said first and second locking means each comprise identical elongated slides movably carried by said guide means for limited longitudinal motion relative to said guide means, one of said slides being mounted opposite in orientation to the other in adjacent sliding contact with one another.

5. A track mechanism as defined in claim 1 wherein said guide means comprises a longitudinal channel member fixed relative to said housing and including a wall parallel to and spaced from a wall of said housing that is parallel to the axes of the switch plungers, said channel further having longitudinal flanges along the respective edges thereof extending between the first wall of the channel and the supporting housing wall:

said first and second locking means each comprising identical slides located within the area bounded by said housing and channel member, one slide being oriented oppositely to the other.

6. An apparatus as defined in claim 1 further comprising:

interlocking means mounted on said guide means engageable by said arms to prevent the simultaneous depression of more than one switch plunger at any given time.

References Cited by the Examiner
UNITED STATES PATENTS 3,126,457   3/1964   Jones _____ 200—5

ROBERT K. SCHAEFER, *Primary Examiner.*

J. R. SCOTT, *Assistant Examiner.*